US006694350B2

(12) United States Patent
Kurashima et al.

(10) Patent No.: US 6,694,350 B2
(45) Date of Patent: *Feb. 17, 2004

(54) INFORMATION PROVIDING SYSTEM, SERVER, CLIENT, INFORMATION PROVIDING METHOD AND RECORDING MEDIUM

(75) Inventors: Akihisa Kurashima, Tokyo (JP); Shigeru Tagashira, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/335,700

(22) Filed: Jun. 18, 1999

(65) Prior Publication Data

US 2003/0105802 A1 Jun. 5, 2003

(30) Foreign Application Priority Data

Jun. 18, 1998 (JP) .......................................... 10-170723

(51) Int. Cl.[7] .............................................. G06F 15/16
(52) U.S. Cl. ....................... 709/203; 709/200; 709/201; 709/205; 709/238; 709/239; 709/245; 370/218; 370/238; 370/252; 370/254
(58) Field of Search ................................ 709/203, 200, 709/238, 239, 245, 201, 205, 226; 370/218, 238, 252, 254, 410, 396, 227; 395/200.49; 707/10

(56) References Cited

U.S. PATENT DOCUMENTS

| 5,774,660 | A | * | 6/1998 | Brendel et al. ............. 709/201 |
| 5,825,772 | A | * | 10/1998 | Dobbins et al. ............ 370/396 |
| 5,828,847 | A | * | 10/1998 | Gehr et al. ................. 709/239 |
| 5,870,546 | A | * | 2/1999 | Kirsch ........................ 709/205 |
| 5,905,872 | A | * | 5/1999 | DeSimone et al. .......... 709/245 |
| 5,920,697 | A | * | 7/1999 | Masters et al. ........ 395/200.49 |
| 5,987,523 | A | * | 11/1999 | Hind et al. .................. 709/245 |
| 6,006,264 | A | * | 12/1999 | Colby et al. ................. 709/226 |
| 6,058,102 | A | * | 5/2000 | Drysdale et al. ............ 370/252 |
| 6,084,858 | A | * | 7/2000 | Matthews et al. .......... 370/238 |
| 6,112,248 | A | * | 8/2000 | Maciel et al. ............... 709/238 |
| 6,128,305 | A | * | 10/2000 | Hjalmtysson et al. ....... 370/410 |
| 6,173,312 | B1 | * | 1/2001 | Atarashi et al. ............. 709/203 |
| 6,185,598 | B1 | * | 2/2001 | Farber et al. ................ 709/200 |
| 6,212,520 | B1 | * | 4/2001 | Maruyama et al. ........... 707/10 |
| 6,240,462 | B1 | * | 5/2001 | Agraharam et al. ........ 709/238 |
| 6,253,230 | B1 | * | 6/2001 | Couland et al. ............ 709/203 |
| 6,256,295 | B1 | * | 7/2001 | Callon ........................ 370/254 |
| 6,295,276 | B1 | * | 9/2001 | Datta et al. ................. 370/218 |
| 6,301,223 | B1 | * | 10/2001 | Hrastar et al. .............. 370/227 |

FOREIGN PATENT DOCUMENTS

JP 62-160840 7/1987

* cited by examiner

Primary Examiner—Hosain Alam
Assistant Examiner—Thu Ha Nguyen
(74) Attorney, Agent, or Firm—Foley & Lardner

(57) ABSTRACT

A client transmits to a server a communication path assignment request packet for requesting a communication path to be assigned. When the server receives the communication path assignment request packet, it selects the communication path as to assign communication loads evenly in the server, and sends a communication path assignment response packet to the client. The communication path switch unit switches the communication path in accordance with the received response packet for providing an assigned communication path in response to the request packet. The client transmits a service starting request packet for requesting a service to be stared. If the server receives the service starting request packet therefrom, it controls a processor, and starts to an information providing service. The client controls a processor, and utilizes the information providing service.

14 Claims, 10 Drawing Sheets

FIG. 2

SERVICE MANAGEMENT TABLE 12

| SERVICE NUMBER | TYPE | NAME | COMMUNICATION PARAMETER | STATE | COMMUNICATION PATH IDENTIFIER | PROGRAM NAME |
|---|---|---|---|---|---|---|
| 1 | INDIVIDUAL | MAP GUIDE | version=1.0 | WAITING | | guide.EXE |
| 2 | BROADCAST | WEATHER FORECAST | multicast=239.254.0.1 | WAITING | | weather.EXE |
| 3 | BROADCAST | MISSING INFORMATION | multicast=239.254.0.3 | IN SERVICE | 29324 | maigo.EXE |

FIG. 4

SERVICE LIST TABLE 23

| SERVER IDENTIFIER | SERVICE NUMBER | TYPE | NAME | COMMUNICATION PARAMETER |
|---|---|---|---|---|
| A | 1 | INDIVIDUAL | MAP GUIDE | version=1.0 |
| A | 2 | BROADCAST | WEATHER FORECAST | multicast=239.254.0.1 |
| A | 3 | BROADCAST | MISSING INFORMATION | multicast=239.254.0.2 |
| B | 1 | BROADCAST | TOWN BULLETIN BOARD | multicast=239.254.0.1 |

FIG. 5

SERVICE LIST TABLE 27

| SERVER IDENTIFIER | COMMUNICATION PATH IDENTIFIER |
|---|---|
| A | 23311 |
| A | 29324 |
| A | 23994 |
| B | 39221 |

FIG. 8

PACKET TYPE | REQUEST FOR COMMUNICATION PATH INFORMATION

FIG. 9

PACKET TYPE

NUMBER OF COMMUNICATION PATHS

REPEAT FOR NUMBER OF COMMUNICATION PATHS { COMMUNICATION PATH IDENTIFIER
DITTO

| COMMUNICATION PATH INFORMATION |
| --- |
| 2 |
| 23311 |
| 29324 |

FIG. 10

PACKET TYPE | REQUEST FOR SERVICE INFORMATION

FIG. 11

| PACKET TYPE | SERVICE INFORMATION |
|---|---|
| NUMBER OF SERVICES | 3 |
| SERVICE NUMBER | 1 |
| SERVICE TYPE | INDIVIDUAL |
| NAME | MAP GUIDE |
| COMMUNICATION PARAMETER | version=1.0 |
| SERVICE NUMBER | 2 |
| SERVICE TYPE | BROADCAST |
| NAME | WEATHER FORECAST |
| COMMUNICATION PARAMETER | multicast=239.254.0.1 |
| SERVICE NUMBER | 3 |
| SERVICE TYPE | BROADCAST |
| NAME | MISSING INFORMATION |
| COMMUNICATION PARAMETER | multicast=239.254.0.2 |

FIG. 13

| PACKET TYPE | SELECTING COMMUNICATION PATH |
|---|---|
| SERVICE NUMBER | 2 |

FIG. 14

| PACKET TYPE | SELECTED COMMUNICATION PATH |
|---|---|
| SERVICE NUMBER | 2 |
| COMMUNICATION IDENTIFIER | 23311 |

FIG. 15

| PACKET TYPE | STARTING SERVICE |
|---|---|
| SERVICE NUMBER | 2 |

FIG. 16

| PACKET TYPE | SERVICE ACTIVATED |
|---|---|
| SERVICE NUMBER | 2 |
| PARAMETER | PORT=1250 |

INFORMATION PROVIDING SYSTEM, SERVER, CLIENT, INFORMATION PROVIDING METHOD AND RECORDING MEDIUM

BACKGROUND OF THE INVENTION

1. Field of the Invention

The present invention relates to an information providing service system including a server, which includes a plurality of communication interface, and a plurality of clients, each of which includes at least a communication interface, which are connected with each other via a network.

2. Description of the Related Art

In an information providing system, a server provides a client with information which is stored in the server.

However, in the prior information providing systems, a client has carelessly selected a communication path to a server, without determining between the server and the client whether or not the communication path has been preferably selected. Thus, the client can not select a preferred communication path among a plurality of communication paths which are secured by the server, because it can not recognize, for example, a communication load between the server and the client.

SUMMARY OF THE INVENTION

The present invention has been made in consideration of the above, and an object thereof is to provide an information providing system capable of selecting a preferred communication path among a plurality of communication paths.

In order to achieve the above-described object, according to the first aspect of the present invention, there is provided an information providing system including a server and at least one client which are connected with each other via a plurality of communication paths, wherein the server comprises receiving means for receiving a request message which is sent from the at least one client, communication path identifying means for identifying a communication path to be used for communicating with the at least one client for service information, transmitting means for transmitting to the at least one client a communication path message for specifying the communication path which is identified by the communication path identifying means and service providing means for transmitting the service information to the at least one client; and wherein the at least one client comprises transmitting means for transmitting to the server the request message for requesting the service information to be provided, receiving means for receiving the communication path message sent from the server;

communication path switching means for switching the communication path, which is used for communicating with the server for the service information, in accordance with the communication path message received by the receiving means; and service utilizing means for receiving the service information which is sent from the server via the communication path switched by the communication path switching means.

According to the present invention, the communication path identifying means identifies a communication path to be used for communicating with the at least one client for the service information. The transmitting means in the server transmit to the at least one client the communication path message for specifying the communication path which is identified by the communication path identifying means. The communication path switching means switches a communication path, which is used for communicating with the server for the service information, in accordance with the communication path message received by the receiving means in the at least one client. The service utilizing means receives the service information which is transmitted from the server via the communication path, which is switched by the communication path switching means. The service providing means transmits the service information to the at least one client via the communication path, which is identified by the communication path identifying means. As a result of this, a preferred communication path among the plurality of communication paths can be selected.

The server may further comprise service management means for controlling communication conditions for communicating with the at least one client for service information; and the communication path identifying means may identify a communication path to be used for communicating with the client as to spread communication loads between the server and the client. In this case, a preferred communication path among the plurality of communication paths can be selected, to which communication path the spread communication loads in the server are given.

The server may further comprise identifier storage means for storing identifier information identifying a communication path;

the transmitting means in the server may transmit to the at least one client a communication path message which contains the identifier information stored in the identifier storage means, the identifier storage means specifying the communication path identified by the communication path identifying means;

the receiving means in the at least one client may receive the communication path message which is transmitted by the transmitting means in the server; and the communication path switching means in the at least one client may switch a communication path in accordance with the identifier information which is contained in the communication path message received by the receiving means.

In order to achieve the above-described object, according to the second aspect of the present invention, there is provided an information providing system including a server and at least one client which are connected with each other via a plurality of communication paths, the system comprising:

client-side transmitting means for transmitting a request message for requesting service information to be provided, to the server;

server-side receiving means for receiving the request message which is sent from the client-side transmitting means;

communication path identifying means for identifying a communication path to be used for communicating with the at least one client for service information;

server-side transmitting means for transmitting, to the at least one client, a communication path message for specifying the communication path which is identified by the communication path identifying means;

client-side receiving means for receiving the communication path message which is sent from the server-side transmitting means;

communication path switching means for switching the communication path to be used for communicating with the server for the service information, in accordance with the communication path message received by the client-side receiving means;

service utilizing means for receiving the service information sent from the server via the communication path which is switched by the communication path switching means; and service providing means for transmitting the service information to the at least one client via the communication path which is identified by the communication path identifying means.

According to the present invention, the communication path identifying means identifies a communication path to be used for communicating with the client for the service information. The server-side transmitting means transmits, to the at least one client, the communication path message for specifying the communication path which is identified by the communication path identifying means. The communication path switching means switches the communication path to be used for communicating with the server for the service information, in accordance with the communication path message received by the client-side receiving means. The service utilizing means receives the service information, which is sent from the server via the communication path switched by the communication path switching means. The service providing means transmits the service information to the at least one client via the communication path which is identified by the communication path identifying means. Accordingly, a communication path can be preferably selected from the plurality of communication paths.

In order to achieve the above-described object, according to the third aspect of the present invention, there is provided a server which is connected to at least one client via a plurality of communication paths, the server comprising:

receiving means for receiving a request message which is transmitted from the at least one client;

communication path identifying means for identifying a communication path to be used for communicating with the at least one client for service information;

transmitting means for transmitting a communication path message for specifying the communication path identified by the communication path identifying means, to the at least one client; and service providing means for transmitting service information to the at least one client.

According to the present invention, the communication path identifying means identifies a communication path to be used for communicating with the at least one client for service information. The transmitting means transmits a communication path message for specifying the communication path identified by the communication path identifying means to the client. The service providing means transmits the service information to the client. Accordingly, a preferred communication path among the plurality of communication paths can be selected In order to achieve the above-described object, according to the fourth aspect of the present invention, there is provided at least one client which is connected to a server via a plurality of communication paths, the client comprising:

transmitting means for transmitting to the server a request message for requesting service information to be provided;

receiving means for receiving a communication path message which the server has transmitted;

communication path switching means for switching a communication path to be used for communicating with the server for service information, in accordance with the communication path message which the receiving means has received; and service utilizing means for receiving the service information which is transmitted from the server via the communication path switched by the communication path switching means.

According to the present invention, the transmitting means may transmit to the server the request message for requesting service information to be provided. The receiving means may receive the communication path message which the server has transmitted thereto. The communication path switching means may switch the communication path to be used for communicating with the server for service information, in accordance with the communication path message received by the receiving means. The service utilizing means receives the service information which is transmitted from the server via the communication path switched by the communication path switching means. Accordingly, a preferred communication path among the plurality of communication paths can be selected.

In order to achieve the above-described object, according to the fifth aspect of the present invention, there is provided an information providing method in which a server and at least one client are connected with each other via a plurality of communication paths, the method comprising:

transmitting from the at least one client to the server a request message for requesting service information to be provided;

receiving the request message which is transmitted from the at least one client to the server;

identifying a communication path to be used for communicating with the at least one client for service information;

transmitting, from the server to the at least one client, a communication path message for specifying the identified communication path;

receiving the communication path message which is transmitted to the at least one client;

switching the communication path to be used for communicating with the server for the service information, in accordance with the communication path message received by the at least one client;

transmitting the service information to the at least one client via the identified communication path; and receiving the service information which is transmitted from the server via the switched communication path.

According to the present invention, the server or the at least one client identifies a communication path to be used for communicating with the at least one client for the service information. The server transmits, to the at least one client, a communication path message for specifying the identified communication path. The at least one client switches the communication path to be used for communicating with the server, in accordance with the received communication path message. The at least one client receives the service information which is transmitted from the server via the switched communication path. The server transmits the service information to the at least one client via the identified communication path. As a result, a preferred communication path among the plurality of communication paths can be selected.

In order to achieve the above-described object, according to the sixth aspect of the present invention, there is provided a computer readable recording medium which records programs for transmitting and receiving information providing services between a server and at least one client, both of which are connected with each other via a plurality of communication paths, the medium recording the programs for executing:

a client-side transmitting step of transmitting, to the server, a request message for requesting service information to be provided;

a server-side receiving step of receiving the request message which is transmitted by the client-side transmitting step;

a communication path identifying step of identifying a communication path to be used for communicating with the at least one client for service information;

a server-side transmitting step of transmitting a communication path message for specifying the communication path identified by the communication path identifying step, to the at least one client;

a client-side receiving step of receiving the communication path message which is transmitted by the server-side transmitting step;

a communication path switching step of switching the communication path to be used for communicating with the server for the service information, in accordance with the communication path message received by the client-side receiving step;

a service utilizing step of utilizing the service information which is transmitted from the server via the communication path switched by the communication path switching step; and a service providing step of transmitting the service information to the at least one client via the communication path identified by the communication path identifying step.

In order to achieve the above-described object, according to the seventh aspect of the present invention, there is provided a computer readable recording medium which records programs for transmitting information providing services to at least one client, which is connected via a plurality of communication paths, the medium recording the programs for executing:

a receiving step of receiving a request message which is transmitted from the at least one client;

a communication path identifying step of identifying a communication path to be used for communicating with the at least one client for service information;

a transmitting step of transmitting, to the at least one client, a communication path message for specifying the communication path identified by the communication path identifying step; and a service providing step of transmitting the service information to the at least one client.

In order to achieve the above-described object, according to the eighth aspect of the present invention, there is provided a computer readable recording medium which records programs for requesting information providing services to a server, which is connected via a plurality of communication paths, the medium recording programs for executing:

a transmitting step of transmitting, to the server, a request message for requesting service information to be provided;

a receiving step of receiving a communication path message transmitted from the server;

a communication path switching step of switching a communication path to be used for communicating with the server for service information, in accordance with the communication path message received by the receiving step; and a service utilizing step of receiving the service information transmitted from the server via the communication path switched by the communication path switching step.

In order to achieve the above-described object, according to the ninth aspect of the present invention, there is provided a computer data signal embodied in a carrier wave, the data signal being processed in a server which is connected to at least one client via a plurality of communication paths, the computer data signal comprising:

a receiving code segment for receiving a request message which is transmitted from the at least one client;

a communication path identifying code segment for identifying a communication path to be used for communicating with the at least one client;

a transmitting code segment for transmitting, to the at least one client, a communication path message for specifying the communication path identified by the communication path identifying code segment; and a service providing code segment for transmitting service information to the at least one client via the communication path identified by processing the communication path identifying code segment.

In order to achieve the above-described object, according to the present invention, there is provided a computer data signal embodied in a carrier wave, the data signal being processed in at least one client which is connected to a server via a plurality of communication paths, the computer data signal comprising:

a transmitting code segment for transmitting, to the server, a request message for requesting service information to be provided;

a receiving code segment for receiving a communication path message which is transmitted from the server;

a communication path switching code segment for switching a communication path to be used for communicating with the server for service information, in accordance with the communication path message received by the receiving code segment; and a service utilizing code segment for receiving service information which is transmitted from the server via the communication path switched by processing the communication path switching code segment.

BRIEF DESCRIPTION OF THE DRAWINGS

These objects and other objects and advantages of the present invention will become more apparent upon reading of the following detailed description and the accompanying drawings in which:

FIG. 2 is an exemplary diagram showing a list of providing services which can be provided and are stored in a service management table;

FIG. 4 is an exemplary diagram showing a list of information services which are provided to each server and are stored in a service list table;

FIG. 5 is an exemplary diagram showing a list of communication paths which are in a communicable state and are stored in a server list table;

FIG. 8 is a diagram exemplifying a request packet for requesting communication path information;

FIG. 9 is a diagram exemplifying a response packet for providing communication path information;

FIG. 10 is a diagram exemplifying a request packet for requesting service information;

FIG. 11 is a diagram exemplifying a response packet for providing service information;

FIG. 13 is a diagram showing an example of a request packet for requesting communication path to be assigned;

FIG. 14 is a diagram showing an example of a response packet for providing an assigned communication path;

FIG. 15 is a diagram showing an example of a request packet for requesting a service to be started; and FIG. 16 is a diagram showing an example of a response packet for providing a service.

DETAILED DESCRIPTION OF THE PREFERRED EMBODIMENT

An information providing system according to an embodiment of the present invention will now be described with reference to the accompanying drawings.

In this information providing system, at least one server and at least one client communicate with each other. For easy understanding, an embodiment, wherein a server and at least one client communicate with each other, of the present invention will now be explained by way of an example.

In this embodiment, a client switches one communication path to another and utilizes the contents of a service which are provided by a server, by the following procedure in which:

(a) the client requests the server to send information about communication paths;

(b) the server responds, to the client, information about communication paths which are available between the server and the client;

(c) the client requests server to send information about services the server can provide the client with;

(d) the server responds, to the client, information about services with which the server can provide the client;

(e) the client selects one or more communication paths among the available ones in accordance with information about communication paths and services;

(f) the client requests the server to select a preferable communication path from the ones the client selected;

(g) the server selects a preferable communication path between the client and the server;

(h) the server responds, to the client, the selected communication path;

(i) the clients switches to the communication path, the sever selected, from one through which the client and the server have communicated with each other;

(j) the client requests the server to start the service;

(k) the server responds, to the client, that the requested service is started;

(l) the client requests the server to send contents of the service;

(m) the server sends, to the client, the contents of the service; and (n) the client utilizes the contents thereof.

Figure 1:
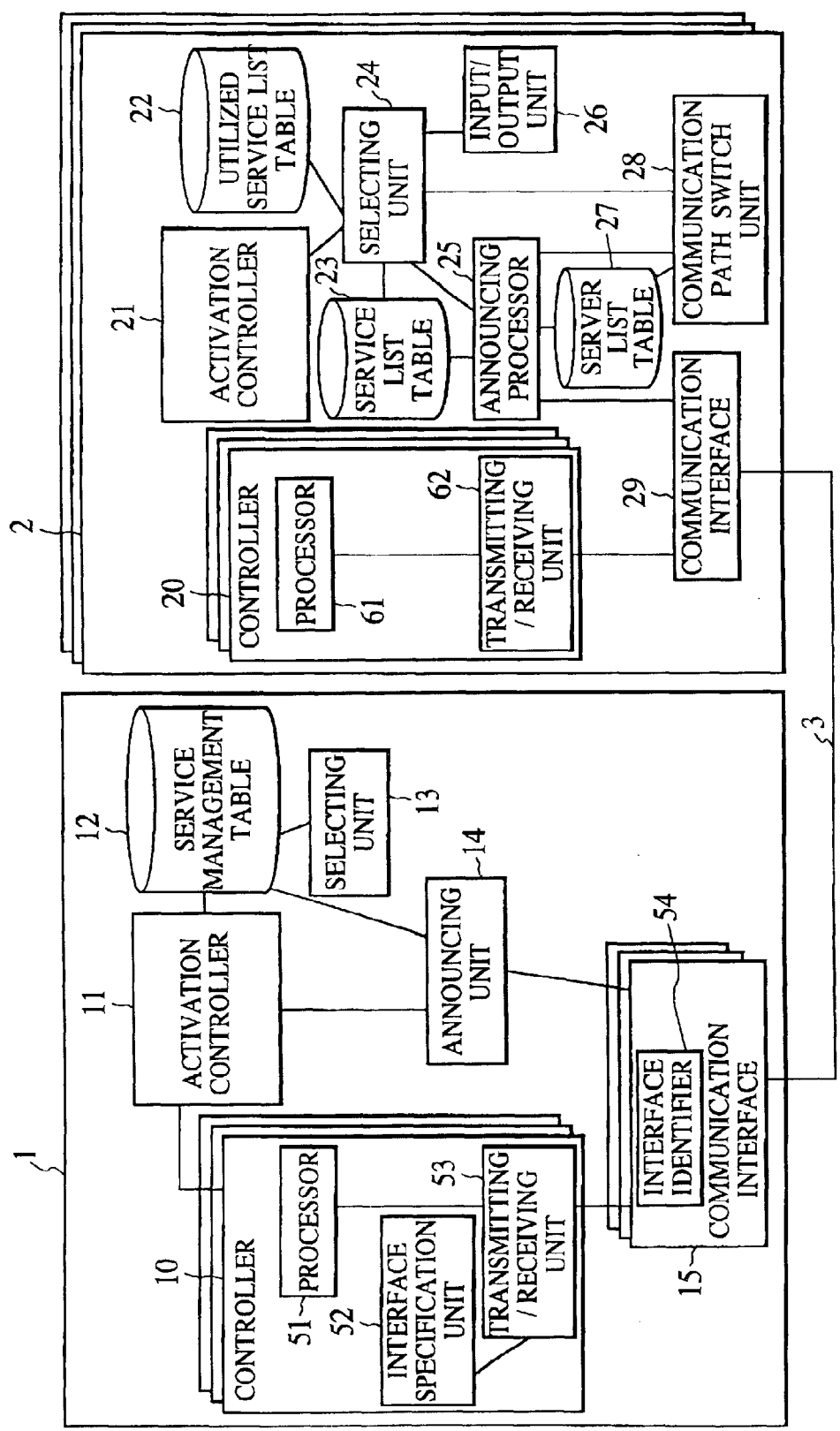
FIG. 1 is an exemplary diagram showing the structure of an information providing system according to an embodiment of the present invention.

FIG. 1 is a block diagram exemplifying an information providing system according to an embodiment of the present invention. The information providing system comprises a plurality of servers and clients, which are connected via a communication path respectively. FIG. 1 illustrates the structure wherein a server 1 among servers and a plurality of clients 2 are connected with each other via a computer network including a communication path 3.

The computer network includes a cable network such as an ISDN (Integrated Services Digital Network), an Ethernet cable network, a radio network such as a radio LAN (Local Area Network), or a mobile network using a portable telephone or a PHS (Personal Handy-phone System), etc. In other words, the computer network comprises physical line units and logical ones.

The server 1 comprises a plurality of controllers 10, an activation controller 11, a service management table 12, a selecting unit 13, an announcing unit 14, and a plurality of communication interfaces 15.

Each of the controllers 10 comprises a processor 51, an interface specification unit 52, and a transmitting/receiving unit 53.

The processor 51 executes data transmission/reception processing for various services. The interface specification unit 52 specifies a communication interface 15 while the transmitting/receiving unit 53 transmits and receives information to and from the plurality of clients 2 via the communications interface 15.

The activation controller 11 activates a preferable processor 51 to provide the client 2 with a service.

The service management table 12 stores information for managing services with which the server 1 can provide the plurality of clients 2. FIG. 2 exemplifies the service management table 12.

In the example of FIG. 2, the service management table 12 stores information regarding three kinds of services. In a service number field, numbers for specifying each service are stored.

A type field indicates types of providing services. There are two types of providing services, an "individual" type and a "broadcast" type. In a case where a service of the "broadcast" type is simultaneously provided to a plurality of clients 2, the server 1 sends the same contents of the service to the plurality of clients 2. In a case where a service of the individual type is simultaneously provided to the plurality of clients 2, the server 1 individually provides the plurality of clients 2 with the contents of the service. In other words, the plurality of clients 2 individually receive the contents of the service which may differ from one another, even if they simultaneously are provided with the same service by the server 1.

Figure 3:
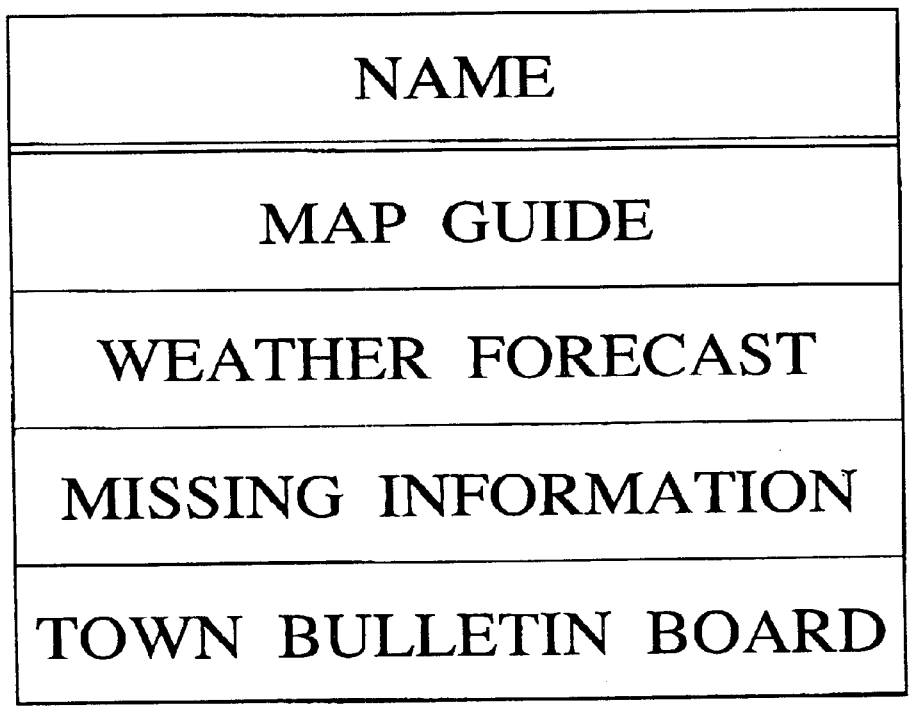
FIG. 3 is an exemplary diagram showing a list of past utilization data which are stored in a utilized-service list table.

In FIG. 3, a name field specifies names of services. As illustrated in FIG. 3, three types of services, such as map guide, whether forecast, missing information, are stored. A communication parameter field therein indicates parameters of services.

A state field therein indicates if the service is at this time in service, i.e., activated (in service), or if the server 1 waits for a request from the clients 2 to start the service (waiting).

A communication path identifier field in FIG. 3 indicates numbers for specifying communication paths which are used when the server 1 provides the clients 2 with the service.

A program name field indicates names of programs to be executed when providing the service.

The selecting unit 13 selects a preferable communication path 3 for transmitting and receiving information.

The announcing unit 14 controls activation controller 11 and communication interfaces 15 to transmit various packets to the plurality of clients 2.

Each communication interface 15 includes an ISDN terminal adapter, an Ethernet interface board, a PC card (Personal Computer Card), i.e., a PCMCIA (Personal Computer Memory Card International Association) card for the radio LAN or cable LAN, etc. Each of the communication interfaces 15 communicates with the client 2 via the selected communication path 3.

Each interface identifier 54 identifies the communication interface 15 associated with it. The communication interfaces 15 having different interface identifiers 54 communicate with the clients 2 via different communication paths 3.

The interface identifier 54 includes a MAC (Media Access Control) address on the Ethernet card, etc., a sub address of the ISDN, an IP (Internet Protocol) address on an IP network, a port number of a TCP (Transmission Control Protocol) or a UDP (User Datagram Protocol), or the like.

Each of the client 2 comprises a plurality of controllers 20, an activation controller 21, a utilized-service list table 22, a service list table 23, a selecting unit 24, an announcing processor 25, an input/output unit 26, a server list table 27, a communication path switch unit 28, and a communication interface 29.

Each of the controllers 20 includes a processor 61 and a transmitting/receiving unit 62.

The processor 61 controls the transmitting/receiving unit 62 to transmit and receive various packets to and from the server 1 via the interface 29.

The activation controller 21 activates the processor 61 in a predetermined manner.

The utilized-service list table 22 stores a list of services which are previously utilized in the client 2. FIG. 3 exemplifies the utilized-service list table 22.

The name field in the utilized-service list table 22 indicates names of the services previously utilized by the clients 2. According to the utilized-service list table illustrated in FIG. 3, it is obvious that the client 2 has previously utilized the services of the map guide, whether forecast, missing information, and town bulletin board.

The service list table 23 stores information about servers and services with which the servers provide. FIG. 4 exemplifies the service list table 23.

A server identifier field stores symbols for identifying the server 1 which provide the clients 2 with the service. For specifying the server 1, an arbitrary mark, such as an English letter, a numerical value, the string thereof, and a domain name of the server 1 may be used. By referring to the server list table 23 shown in FIG. 4, it is obvious that there are indicated two types of servers. The server identifiers are local values within a client 2, so that, in this embodiment, different server identifiers may be assigned to the identical server 1 by the different clients 2.

The type field, name field, communication parameter fields in the service list table 23 shown in FIG. 4 are the same as those of the service management table 12.

The input/output unit 26 includes an input device, for example, a keyboard, a mouse and the like, and a display device, for example, CRT (Cathode Ray Tube), etc. In this embodiment, a user may operate the input/output unit 26, such as the keyboard or the mouse, and selects a desired service. The obtained contents of the service from the server 1 are displayed on the input/output unit 26, such as the CRT or the like.

The selecting unit 24 specifies a service which the user has indicated with the input/output unit 26.

The announcing processor 25 controls the communication path switch unit 28 and communication interface 29 to transmit and receive various packets to and from the server 1, by referring to the service list table 23, the server list table 27 and indication from selecting unit 26.

The server list table 27 stores information about servers 1 and communication paths 3 which are associated therewith. FIG. 5 illustrates an example of the server list table 27. The server list table 27 contains server identifiers and communication path Identifiers. The server identifiers are the same as those of the service list table 23 shown in FIG. 4. The communication path identifiers are numbers for identifying the communication paths 3 which are previously used for communicating with the server 1, and are the same as those of the management table 12 shown in FIG. 2.

Each of the communication path identifiers is in one-to-one correspondence with the interface identifier 54 corresponding to each communication interface 15 of the server 1. Accordingly, it the clients 2 use different communication path identifiers, the clients 2 communicate with the server 1 via different communication paths.

The announcing processor 25 controls the communication path switch unit 28 to switch to a preferable communication path 3 from the old one.

The communication interface 29 includes an ISDN adapter, an Ethernet interface board, and a PC card of a radio LAN or a cable LAN, etc., and communicates with the server 1 via the computer network.

In a case where the service is of the "individual" type, each processor 51 of the server 1 communicates with the processor 61 of the clients 2. In other words, the number of the processors 51 which are activated by the server 1 is equal to the number of the clients 2 utilizing the service. Accordingly, even if the respective clients 2 simultaneously utilize the same service, the server 1 can provide the clients 2 with distinct contents of the service in response to the request from the user.

In a case where the service is of the "broadcast" type, each processor 51 of the server 1 communicates with the processors 61 of the clients 2. In other words, the processor 51 is shared among the processors 61 of the clients 2 utilizing the same service of the server 1. In this case where the service is of the "broadcast type", a single processor 51 operates processes for providing the service. In a case where a plurality of clients 2 simultaneously utilize the service, processor 51 simultaneously provides the plurality of clients 2 with the same contents of the service.

The server 1 repeats a procedure wherein the server 1 receives the packets, checks the contents of the received packets, and performs processing in accordance with the contents thereof. Such a procedure is called a "server operation". The server operation will now be described with reference to the flowchart shown in FIG. 6.

Figure 6:
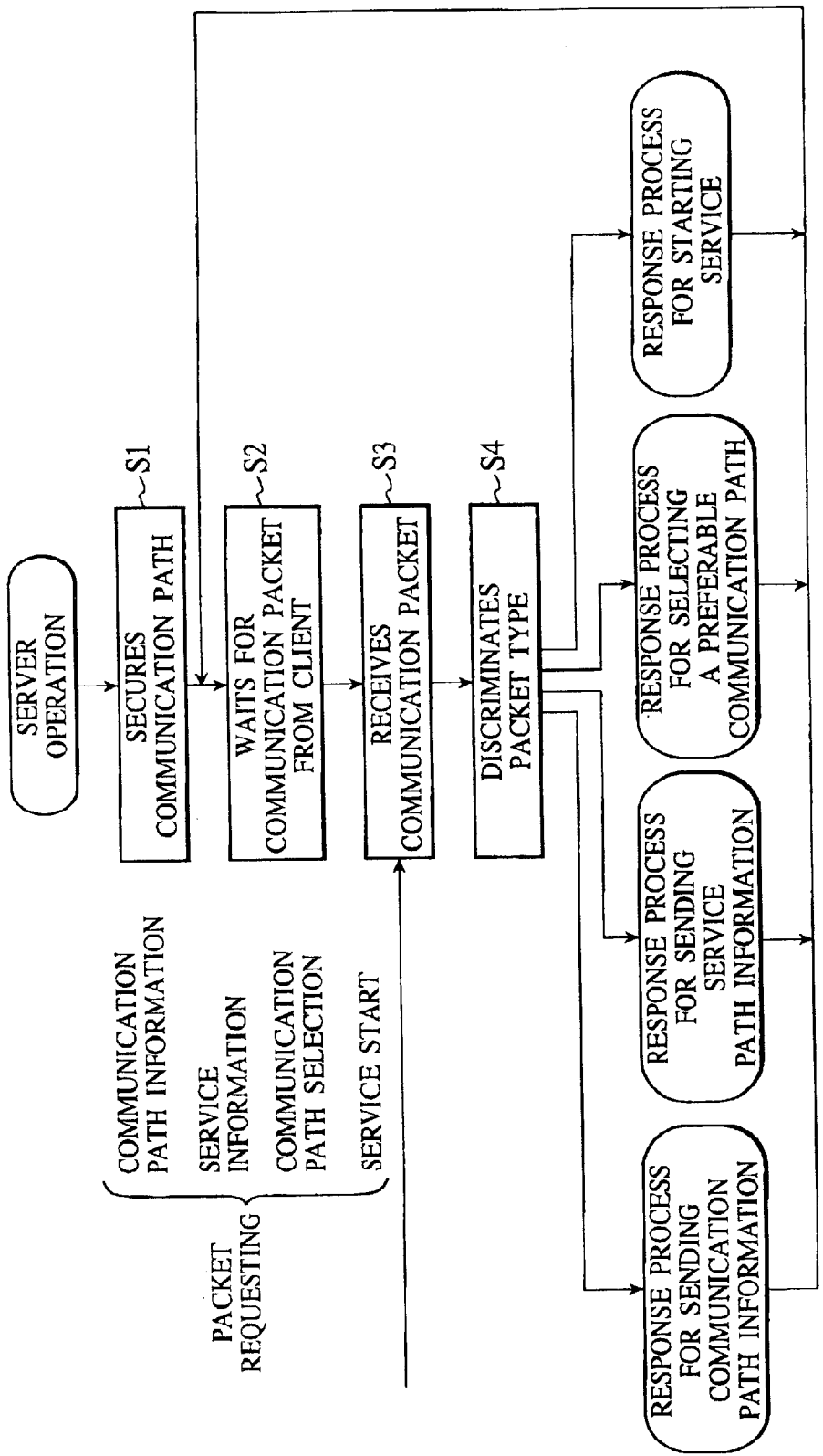
FIG. 6 is a flowchart for explaining packet receiving processing which is executed by the server.

The server operation shown in FIG. 6 begins to be processed, after a power source is supplied to the server 1, and a predetermined general initialization process is completed.

The server 1 secures a communication path to each communication interface 15 of the plurality of clients 2 (Step S1) More specifically, the announcing unit 14 of the server 1 initializes at least one communication interface 15 to communicate with a plural of clients 2.

The server 1 waits for a packet from the clients 2 via the available communication interface 15 (Step S2).

The server 1 receives a packet from the client 2 (Step S3). The packet from the client 2 includes:

(a) a packet for requesting the server to send communication path information which are stored in the service management table 12;

(b) a packet for requesting the server to send service information which are stored in the service management table 12;

(c) a packet for requesting the server to select a preferable communication path; and (d) a packet for requesting the server to start a service.

The server 1 discriminates the type of the received packet from the above-described four types of discrimination (Step S4), and executes the following processes each corresponding to the service type, and the flow goes back to Step S2, the processes include:

(a) a response process for sending communication path information;

(b) a response process for sending service information;

(c) a response process for selecting a preferable communication path; and (d) a response process for starting a service.

The above-described processes will specifically be described later.

The server 1 may executes not only the server operation, but various operations. For example, the server 1 may periodically transmit information about each interface identifier 54 of each communication interface 15 to the computer network.

Figure 7:
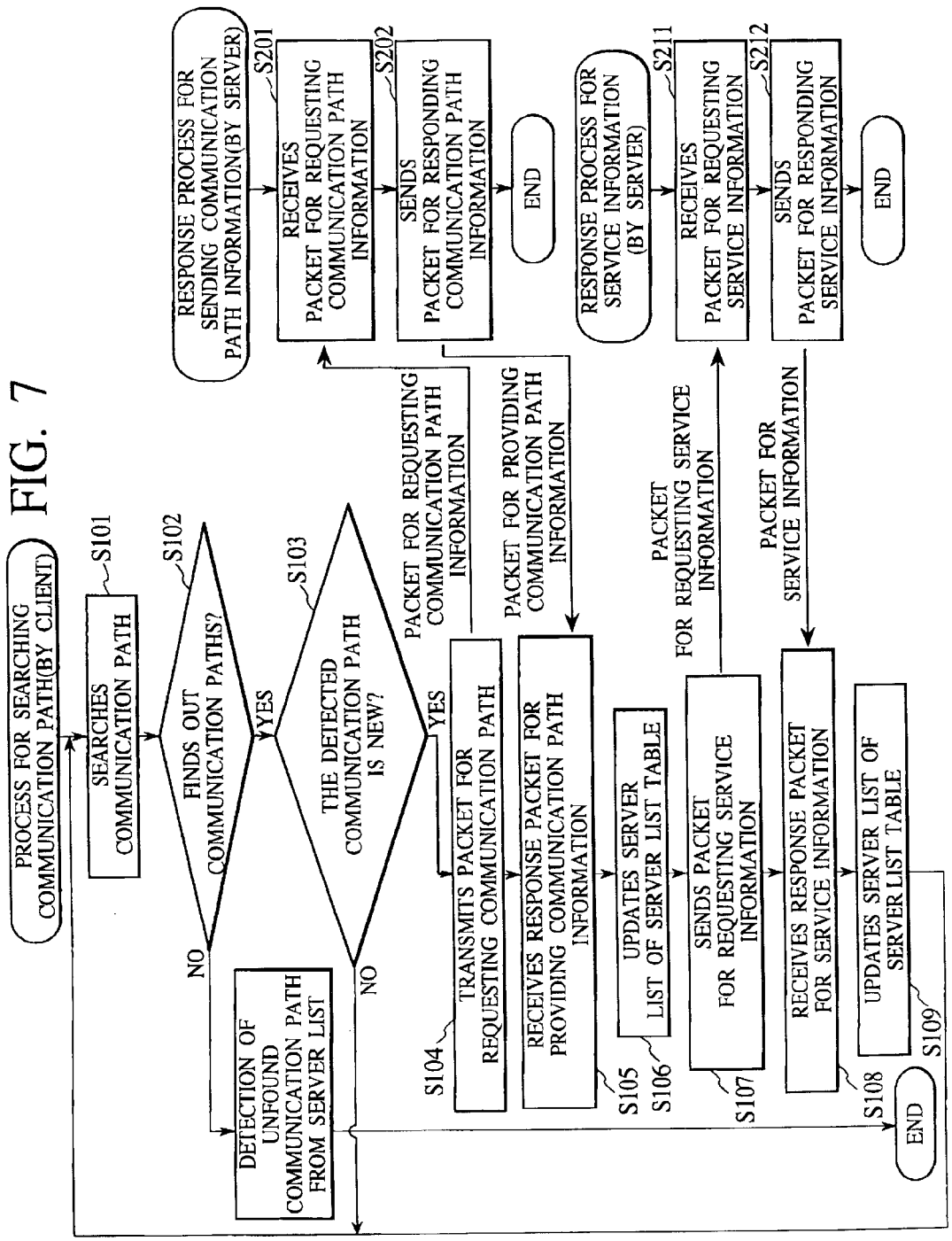
FIG. 7 is a flowchart for explaining communication path searching processing which is executed by at least one client, and communication path information response processing and information response processing which are executed by the server.

On the other hand, after a power source is supplied to each client 2, the client 2 performs a general initialization process, initializes its server list table 27 and executes a process for searching communication paths shown in FIG. 7.

The client 2 searches the available communication paths through which the client 2 can communicate with the server 1 (Step S101). More specifically, the announcing processor 25 of the client 2 controls the communication path switch unit 28 to switch to one of the communication interfaces 15 of server 1 from the current one (Step S102).

If the communication path switch unit 28 detects that communication between the server 1 and the client 2 is not established, it informs the announcing processor 25 of the unavailable communication path. Then the announcing processor 25 deletes the corresponding pair of the server and the communication path identifier from the server list table 27 (Step S110).

If the communication path switch unit 28 detects that communication is capable therebetween, i.e. communication between the communication interface 15 and the communication interface 29 is established, it informs the announcing processor 25 of the detected communication path between such communication interfaces 15 and 29.

After the announcing processor 25 is informed about the detection of the available communication path from the communication path switch unit 28 in Step S102, it determines whether or not the communication path identifier of the detected communication path 3 is stored in the server list table 27 shown in FIG. 5, i.e., whether it is an old communication path or a new one (Step S103).

In a case where it is determined that the communication path identifier has already been stored in the server list table 27, the flow goes back to Step S101 and repeats the same process against another communication path 3.

On the contrary, if the client 2 determines that the detected communication path is a new communication path, it requests the server 1 to send information about the communication path identifier associated with the communication interface 15 of the server 1 (Step S104). In other words, the client 2 sends, to the server 1, the packet for requesting communication path information listed in the communication path identifier field of the service management table 12 of the server 1 via the computer network. FIG. 8 exemplifies a request packet for requesting communication path information. This packet contains its type tag "request for communication path information", but does not have any parameters.

The server 1 receives this packet (Step S201). Step S201 is the first step of the response process for sending communication path information shown in FIG. 6. Then the server 1 takes the information of the communication path identifier, generates a response packet including this information, and transmits it to the client 2 (Step S202). FIG. 9 exemplifies a response packet for providing communication path information.

For example, the packet shown in FIG. 9 contains its type tag "communication path information", the number of the available communication paths, which is 2, and the communication path identifiers of them, 23311 and 29324.

The server 1 may delete the communication path identifiers associated with the communication path via which the client 2 transmits the packet for requesting communication path information to the server 1, because such communication path identifier is clearly stored in the server list table 27 of the client 2.

After the server 1 sends the generated packet to the client 2, the response process for communication path is completed.

The client 2 receives the packet for providing the communication path information from the server 1 (Step S105), and it updates the server list table 27 to add new communication path identifiers included in the packet of the server list table 27 (Step S106). More specifically, the announcing processor 25 collates each communication path identifier information in the packet with communication path identifiers of the server associated wherewith stored in the server list table 27. Since one or more communication path identifiers in the packet are not stored in the server list table 27, the announcing processor 25 adds the pair of the communication path identifier and the server identifier associated therewith.

At this time, in the case where the server identifier is not stored in the server list table 27, i.e., the server is a new server, the announcing processor 25 generates a unique server identifier identifying the new server 1.

The client 2 sends to the server a packet for requesting service information (Step S107). That is, the client 2 generates a request packet for requesting the service information, and sends the generated packet to the server 1 via the computer network. FIG. 10 exemplifies a packet for requesting service information. This packet shown in FIG. 10 only contains the packet tag "request for service information".

The server 1 receives the packet for requesting the service information from the client 2 (Step S211). This step is the first step of the response process for sending service information.

The announcing unit 14 of the server 1 generates a response packet including the service information which is stored in the service management table 12 of the server 1. FIG. 11 exemplifies a response packet for providing service information.

This packet shown in FIG. 11 contains its packet tag "service information" and the number of services, with which the server 1 provide the client 2. In this example, in the server field, a value "3" is included in this packet. The number of the tuples are equal to the number of services stored in this packet. The first tuple comprises a service number 1, a service type "individual", a service name "map guide", and parameter "version=1.0".

The server 1 sends the generated response packet to the client 2 (Step S212) and completes the response process for sending service information.

The client 2 receives the response packet including service information from the server 11 (Step S108).

The client 2 updates service list table 23, adding service information included in the packet received in Step S108 (Step S109). More specifically, the announcing processor 25 collates each tuples of service information in the response packet, with service information of the corresponding server listed in the service list table 23. If one or more new tuples of service information are found, i.e., such tuples are not stored in the service list table 23, the announcing processor 25 adds them to the service list table 23.

As a result of this, the client 2 may receive a list of the communicable servers and a list of the services which can be utilized in the client 2 now, i.e., the user of the client 2 can utilize such services operating the input/output unit 26. The client 2 stores in the server list table 27 the list of the servers 1 which can communicate with the client 2, and in the service list table 23 the list of services which can be utilized in the client 2. The client 2 refers these tables 23 and 27 when utilizing any of the services.

Figure 12:
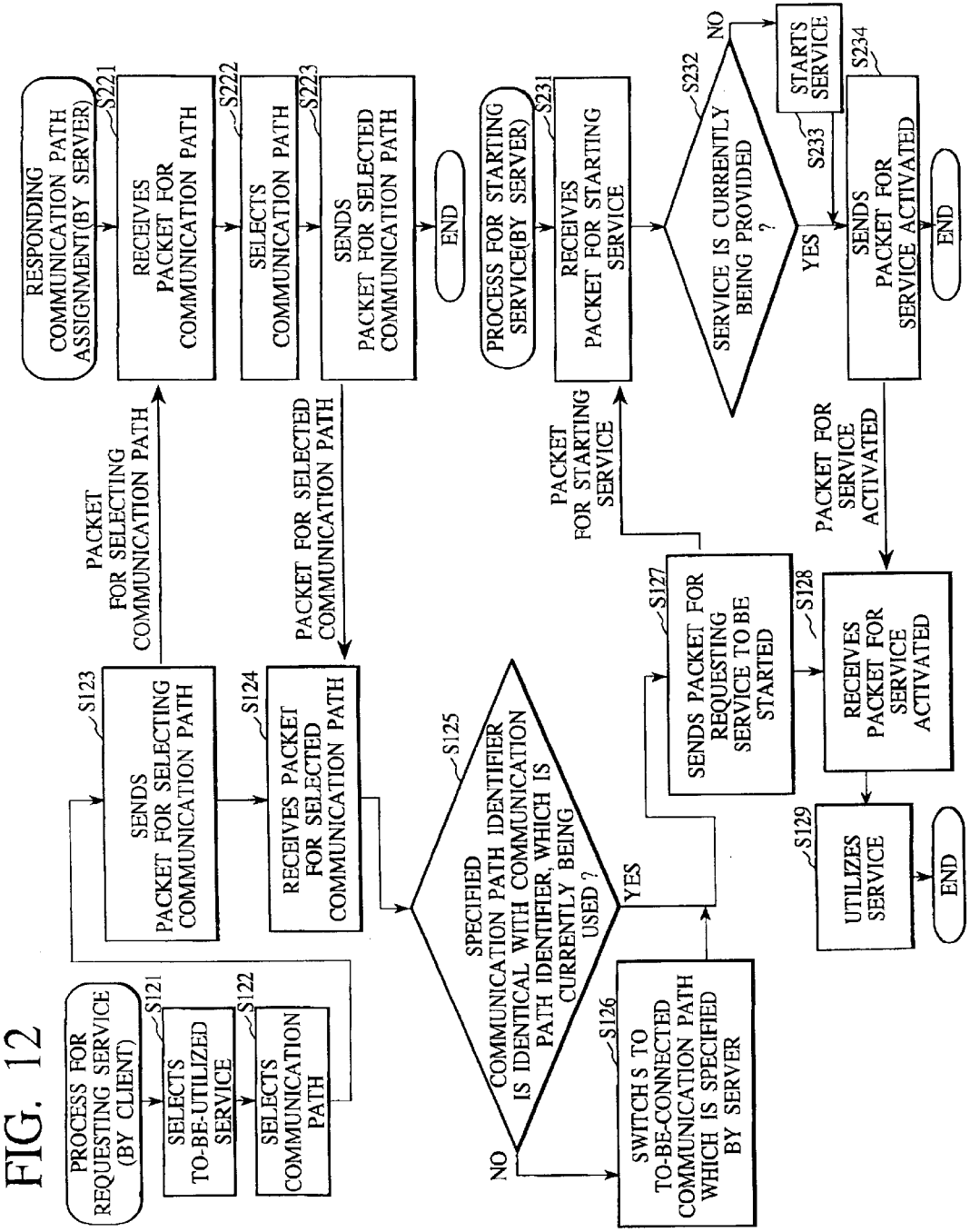
FIG. 12 is a flowchart for explaining service utilizing processing which is executed by the at least one client, and communication path assignment processing and response processing which are executed by the server.

A process for utilizing a service is executed by the client 2, and a process for selecting a communication path and a process for starting a service are executed by the server 1. These processes will now be explained with reference to a flowchart shown in FIG. 12.

In the client 2, a service which the client 2 intends to utilize is selected (Step S121). More specifically, the input/output unit 26 of the client 2 displays service information which is stored in the service list table 23, accepts an input for selecting a service from the user, and acquires information about the selected service. This service will be utilized by the user.

The input/output unit 26 supplies, to the selecting unit 24, the information about the service selected by the user. The selecting unit 24 allows the acquired information about the selected service to be stored in the utilized service list table 22. In other words, the utilized service list table 22 stores a list of services, which indicates the services the user of the client 2 has utilized previously. The utilized service list table 22 is shown in FIG. 3. The input/output unit 26 may display the service list which is stored in the utilized-service list table 22 and which the user has utilized previously, and may allow the user to select a desired service therefrom. The client 2 will send, to the server 1, a packet specifying the acquired information about the selected service, by referring to the server list table 27.

The client 2 selects one or more communication paths which are capable of communicating with the specified server 1 (Step S122). That is, the client 2 controls the communication path switch unit 28, and switches from the current communication path to a communication path which is secured by the server 1. More specifically, the communication path switch unit 28 selects one of the plurality of communication paths 3 secured by the specified server 1, by referring to the server list table 27, and allows the selected communication path 3 to be connected with the communication interface 29. The client 2 may randomly select a communication path from the ones secured by the server 1.

When the communication path switch unit 28 completes switching the communication path 3, it informs the announcing processor 25 of the completion of the switch.

After the announcing processor 25 is informed of the completion of the switch, it sends a packet for requesting the selecting communication path, to the specified server 1 (Step S123). More specifically, the client 2 generates the request packet for selecting the communication path, and sends the generated request packet to the server 1 via the switched communication path 3. FIG. 13 exemplifies a request packet for selecting a communication path.

The request packet for selecting a communication path contains a packet tag "selecting communication path" and a service number. In this example, a service number is 2, which indicates that the client 2 wants to utilize a weather forecast service. The server 1 receives the request packet from the client 2 (Step S221). This step is the first step of the process for selecting communication path, shown in FIG. 6.

The server 1 selects a communication path which corresponds to a service number of the received request packet for selecting a communication path (Step S222). More particularly, the server 1 acquires information about the communication path corresponding to the service number of the request packet, and selects the communication path by looking up in the service management table 12.

If the service specified by the received request packet is of the "broadcast" type and has already been started in the server 1, the server 1 acquires information about the communication path 3 from the service management table 12, and select a communication path 3.

On the contrary, if the specified service is of the "individual" type, or the service has not been started yet, the selecting unit 13 selects the communication path randomly or it selects the least utilized communication path among the ones with which the server 1 provide several services listed in the service management table 12.

In the case where the selecting unit 13 selects the least utilized communication path, all the communication paths 3 secured by the server 1 are utilized as fairly as possible and their communication traffic loads are approximately equal.

The server 1 generates a response packet for the selected communication path. FIG. 14 exemplifies a response packet for the selected communication path. The response packet contains a packet tag "selected communication path", a service number, 2, and a communication identifier, 23311, which are stored in the service management table 12.

The server 1 sends the generated packet to the client 2 (Step S223). After the server 1 sends the response packet, it completes the process for selecting communication path.

The client 2 receives the response packet for the selected communication path from the server 1 (Step S124).

The announcing unit 25 of the client 2 determines whether a communication path identifier, specified by the received response packet for selected communication path, is identical with the communication path identifier, which is currently being used (Step S125).

More specifically, if the announcing processor 25 determines that the specified communication path identifier is not identical with the currently-used communication path identifier, it controls the communication path switch unit 28, and switches to a communication path 3 which the server 1 specifies from the currently-used one (Step S126).

The announcing processor 25 sends a request packet for starting a service to the server 1 (Step S127). More specifically, the client 2 generates a request packet for starting a service, and sends the generated request packet to the server 1 via the communication path 3 which is identified in Step S126. FIG. 15 exemplifies a request packet for starting a service.

This packet contains a packet tag "starting service" and a service number which the client 2 wants to utilize. In this example, the service number 2 is associated with the weather forecast service listed in the service list table 23.

The server 1 then receives the request packet for starting a service from the client 2 (Step S231).

The announcing unit 14 of the server 1 determines whether or not the service, which is identified by the received request packet, is currently provided to the client 2 (Step S232). In other words, the announcing unit 14 determines whether or not the identified service is currently provided, by referring to the service management table 12. If the value in the state field associated with the service stored in the service management list 12 indicates "waiting", the service is not currently provided, and if the value indicates "in service", the service has already been started.

In a case where the specified service is of the "broadcast" type and the service has already been started, the announcing unit 14 determines that the service is currently being provided, and generates a response packet for starting a service activated. FIG. 16 exemplifies a response packet for starting a service activated.

This packet has a packet tag "service activated", a service number, 2, and a parameter, "PORT=1250".

In a case where the announcing unit 14 determines that the specified service is not currently provided, it controls the activation controller 11 to start the program of the service. The program is specified in the service management table 12. In other words, the activation controller 11 activates the processor 51 corresponding to the identified service, and supplies to the announcing unit 14 information specifying the service which information is generated by the processor 51.

The server 1 sends the generated response packet to the client 2 (Step S234).

The client 2 then receives from the server the response packet for the service activated (Step S128).

The announcing processor 25 of the client 2 controls the activation controller 21 to utilize the service, which is specified by the received response packet (Step S129). More specifically, the activation controller 21 activates the processor 61 corresponding to the specified service contained in the response packet.

Afterwards, the client 2 may utilize the service of the server 1. In other words, the processor 61 of the client 2 transmits and receives information to and from the server 1 via the transmitting/receiving unit 62. On the other hand, the processor 51 of the server 1 transmits and receives information to and from the client 2 via the interface specification unit 52 and the transmitting/receiving unit 53.

In this embodiment, contents of the service are transmitted and received between the processors 51 and 61, however, the server 1 and the client 2 may monitor operational conditions of the processors respectively.

Thus, when the contents of the service are completely transmitted and received therebetween, it is determined that the service is completely provided. Then, the activation controller 11 of the server 1 informs the announcing unit 14 of the completion of the service, and the announcing unit 14 updates the value in the state field of the service in service management table 12 to "waiting".

Similarly, the activation controller 21 of the client 2 informs the announcing processor 25 of the completion of the service. The announcing processor 25 may start to search the server 1 again and start to utilize the service again after a predetermined period.

Accordingly, the contents of the services are transmitted and received with using a preferred communication path which the server has identified from among the plurality of communication paths, communication loads are fairly spread to the communication paths, and the operation of utilizing the service is processed more faster because of the high-speed communication.

In the above-described embodiment, the packet is transmitted to the client 2 which is identified by the server 1, however, identical packets may be simultaneously transmitted to the other clients 2 using the same communication path 3, by concurrently providing the services by a type of multicast way and such.

In the above-described embodiment, the activation controllers 11 and 21 recognize the completion of the service so as to complete the processing on their own initiative, however, the processing can be completed upon confirmation of a user.

For example, if the client 2 is a portable terminal and the computer network between the client 2 and the server 1 is implemented in the mobile way, etc., when the client 2 goes out of the service area of the server 1, the communication interface 15 of the server 1 detects disconnection of the communication path 3 to the client 2, and the communication interface 29 of the client 2 also detects disconnection to the server 1. After the announcing processor 25 is informed of detection of disconnection and a predetermined interval is passed, it is confirmed whether or not the user of the client 2 wants to continue utilizing the service.

The information providing system of the present invention is not limited to a dedicated system, and can be realized using an ordinary computer system. The information providing system, which execute the above-described processes, can be realized installing programs for carrying out the above-described processes into computers from any medium (a floppy disk, a CD-ROM (Compact Disk Read Only Memory), etc.) which stores the programs.

The medium for supplying the programs to computers may be a communications medium (a medium which temporarily retains the programs, in a fluid manner, like a communications line, a communication network and a communication system). For example, the programs may be presented on the BBS (Bulletin Board System) of the communications network and may be supplied to the computers via the network. Then, the above programs are activated and executed under the control of the OS so as to carry out the above-described processes, as well as other application programs.

As explained above, according to the present invention, contents of services can be transmitted and received using a preferred communication path among a plurality of communication paths.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. H10-170723 filed on Jun. 18, 1998, and including specification, claims, drawings and summary. The disclosure of the above Japanese Patent Application is incorporated herein by reference in its entirety.

What is claimed is:

1. An information providing system including a server and at least one client which is connected to said server via a plurality of communication paths, wherein:

said server;
stores a service identifier and records whether a serviced identified by said service identifier is provided through broadcast or not,
receives a request message from at least one client over a first communication path, said request message containing a service identifier associated with a service which said at least one client requests said server to provide,
assigns a second communication path to be used for bi-directional communication with said at least one client, said second communication path to be assigned being the same as a second communication path which is assigned in response to another request received earlier and containing the same service identifier as that contained in said received request message in a case where it is recorded that the service identified by said service identifier contained in said received request message is provided through broadcast, and
transmits communication path information for specifying the second communication path to said at least one client over the first communication path, and transmits information which is associated with said service identifier to said at least one client over the second communication path, and said at least one client:
transmits said request message over the first communication path to said server,
receives the communication path information transmitted from said server over the first communication path,
switches a communication path to be used for bi-directional communication with said server from the first communication path to the second communication path, and
receives said information which is transmitted from said server via the second communication path.

2. The information providing system according to claim 1, wherein said server controls communication conditions for said information to be transmitted to said at least one client, and assigns said second communication path to be used for bi-directional communication with said at least one client so as to spread communication loads in said server.

3. The information providing system according to claim 1, wherein said server further comprises service management means for controlling communication conditions for the information to be provided to said at least one client, and
said communication path assigning means assigns the second communication path to be used for bi-directional communication with said at least one client so as to spread communication loads in said server, in accordance with said service management means.

4. An information providing system including a server and at least one client which are connected with each other via a plurality of communication paths, wherein said server comprises:

storing means for storing a service identifier and recording whether a serviced identified by said service identifier is provided through broadcast or not,
receiving means for receiving a request message from said at least one client over a first communication path, said request message containing a service identifier associated with a service which said at least one client requests said server to provide,
communication path assigning means for assigning a second communication path used for bi-directional communication with said at least one client, said second communication path being the same as a second communication path which is assigned in response to another request received earlier and containing the same service identifier as that contained in said received request message in a case where it is recorded that the service identified by said service identifier contained in said received request message is provided through broadcast, and
transmitting means for transmitting, to said at least one client over the first communication path, a communication path messages which is associated with said service identifier, for specifying the second communication path identified by said communication path identifying means, and
information providing means for transmitting information to said at least one client over the second communication path, and wherein said at least one client comprises:
transmitting means for transmitting said request message to said server over the first communication path,
receiving means for receiving the communication path message which is transmitted by said server over the first communication path,
communication path switching means for switching a communication path, which is used for communicating with said server, from the first communication path to the second communication path in accordance with the communication path message, and
information utilizing means for receiving said information which is transmitted from said server via the second communication path which was switched by said communication path switching means.

5. The information providing system according to claim 4, wherein:

said server further comprises identifier storage means for storing identifier information identifying the second communication path;
said transmitting means in said server transmits, to said at least one client, a communication path message including the identifier information stored in said identifier storage means for specifying the second communication path;
said receiving means in said at least one client receives the communication path message which is transmitted over the first communication path by said transmitting means in said server; and
said communication path switching means in said at least one client switches a communication path from the first communication path to the second communication path in accordance with the identifier information which is contained in the communication path message.

6. An information providing system including a server and at least one client which are connected with each other via a plurality of communication paths, said system comprising:

client-side transmitting means for transmitting a request message to said server over a first communication path, wherein said request message requests a second communication path to be assigned and information to be provided;

server-side receiving means for receiving said request message; from said at least one client over said first communication path, said request message containing a service identifier associated with a service which said at least one client requests said server to provide;

communication path assigning means for assigning the second communication path to be used for bi-directional communication with said at least one client, said second communication path being the same as a second communication path which is assigned in response to another request received earlier and containing the same service identifier as that contained in said received request message in a case where it is recorded that the service identified by said service identifier contained in said received request message is provided through broadcast;

server-side transmitting means for transmitting over the first communication path to said at least one client a communication path message associated with said service identifier for specifying the second communication path;

client-side receiving means for receiving the communication path message;

communication path switching means for switching a communication path to be used for communicating with said server from the first communication path to the second communication path, in accordance with the communication path message;

client-side service utilizing means for receiving said information which is transmitted from said server via the second communication path; and server-side service providing means for transmitting said information to said at least one client via the second communication path.

7. A server which is connected to at least one client via a plurality of communication paths, said server comprising:

receiving means for receiving a request message from said at least one client over a first communication path, said request message containing a service identifier associated with a service which said at least one client requests said server to provide;

communication path assigning means for assigning the second communication path to be assigned and to be used for bi-directional communication with said at least one client; said second communication path being the same as a second communication path which is assigned in response to another request received earlier and containing the same service identifier as that contained in said received request message in a case where it is recorded that the service identified by said service identifier contained in said received request message is provided through broadcast;

transmitting means for transmitting over the first communication path, to said at least one client, a communication path message; associated with said service identifier, for specifying the second communication path; and service providing means for transmitting information to said at least one client over the second communication path.

8. A client which is connected to a server via a plurality of communication paths, said client comprising:

transmitting means for transmitting a request message to said server over a first communication path, said request message containing a service identifier associated with a service requested of said server;

receiving means for receiving a communication path message which is transmitted from said server over the first communication path; said communication path message containing a second communication path, said second communication path being the same as a second communication path which is assigned in response to another request received earlier and containing the same service identifier as that contained in said received request message in a case where it is recorded that the service identified by said service identifier contained in said received request message is provided through broadcast;

communication path switching means for switching a communication path to be used for bi-directional communication with said server from the first communication path to the second communication path, in accordance with the communication path message; and service utilizing means for receiving information which is transmitted from said server via the second communication path.

9. An information providing method in which a server provides information to at least one client via at least one of a plurality of communication paths, said method comprising:

transmitting from said at least one client to said server over the first communication path a request message for requesting a second communication path to be assigned and for requesting information;

receiving, by said server, the request message; said request message containing a service identifier associated with a service requested of said server;

assigning, by said server, the second communication path to be used for bi-directional communication with said at least one client, said second communication path being the same as a second communication path which is assigned in response to another request received earlier and containing the same service identifier as that contained in said received request message in a case where it is recorded that the service identified by said service identifier contained in said received request message is provided through broadcast;

transmitting from said server to said at least one client over the first communication path a communication path message associated with said service identifier for specifying the second communication path;

receiving, by said at least one client, the communication path message;

switching a communication path to be used for communicating with said server from the first communication path to the second communication path, in accordance with the communication path message;

transmitting said information to said at least one client via the second communication path from said server; and receiving said information from said server via the second communication path.

10. A computer readable storage medium which stores programs for transmitting and receiving information between a server and at least one client which are connected with each other via a plurality of communication paths, said medium storing the programs for executing:

a client-side transmitting step of transmitting over a first communication path, to said server, a request message for requesting a communication path to be assigned and for requesting information from said server;

a server-side receiving step of receiving the request message, said request message containing a service identifier associated with a service which said at least one client requests said server to provide;

a communication path assigning step of assigning the second communication path to be assigned and to be used for bi-directional communication with said at least one client, said second communication path being the same as a second communication path which is assigned in response to another request received earlier and containing the same service identifier as that contained in said received request message in a case where it is recorded that the service identified by said service identifier contained in said received request message is provided through broadcast;

a server-side transmitting step of transmitting over the first communication path, to said at least one client, a communication path message, associated with said service identifier, for specifying the second communication path;

a client-side receiving step of receiving the communication path message;

a communication path switching step of switching a communication path to be used for bi-directional communication with said server from the first communication path to the second communication path, in accordance with the communication path message;

a service utilizing step of receiving information which is transmitted from said server via the second communication path; and a service providing step of transmitting information to said at least one client via the second communication path.

11. A computer readable storage medium which stores programs, executed by a server, for transmitting information to at least one client which is connected via a plurality of communication paths to said server, said medium storing the programs for executing:

a receiving step of receiving a request message from said at least one client over a first communication path, said request message containing a service identifier associated with a service which said at least one client requests said server to provide;

a communication path assigning step of assigning the second communication path to be assigned and to be used for bi-directional communication with said at least one client, said second communication path being the same as a second communication path which is assigned in response to another request received earlier and containing the same service identifier as that contained in said received request message in a case where it is recorded that the service identified by said service identifier contained in said received request message is provided through broadcast;

a transmitting step of transmitting over the first communication path, to said at least one client, a communication path message, associated with said service identifier, for specifying the second communication path; and a service providing step of transmitting information to said at least one client via said second communication path.

12. A computer readable storage medium which stores programs, executed by at least one client, for requesting information from a server which is connected via a plurality of communication paths to said at least one client, said medium storing the programs for executing:

a transmitting step of transmitting over a first communication path, to said server, a request message, said request message containing a service identifier associated with a service requested of said server;

a receiving step of receiving a communication path message which is transmitted from said server over the first communication path; said communication path message containing a second communication path, said second communication path being the same as a second communication path which is assigned in response to another request received earlier and containing the same service identifier as that contained in said received request message in a case where it is recorded that the service identified by said service identifier contained in said received request message is provided through broadcast;

a communication path switching step of switching a communication path to be used for bi-directional communication with said server from the first communication path to the second communication path, in accordance with the communication path message; and a service utilizing step of receiving said information which is transmitted from said server via the second communication path.

13. A computer data signal embodied in a carrier wave, the data signal being processed in a server which is connected to at least one client via a plurality of communication paths, the computer data signal causing the server to perform the functions of:

receiving a request message from said at least one client transmitted over a first communication path, said request message containing a service identifier associated with a service which said at least one client requests said server to provide;

assigning the second communication path to be used for bi-directional communication with said at least one client, said assigned second communication path being the same as a second communication path which is assigned in response to another request received earlier and containing the same service identifier as that contained in said received request message in a case where it is recorded that the service identified by said service identifier contained in said received request message is provided through broadcast;

transmitting over the first communication path, to said at least one client, a communication path message, associated with said service identifier, for specifying the second communication path; and transmitting information to said at least one client via the second communication path.

14. A computer data signal embodied in a carrier wave, the data signal being processed in at least one client which is connected to a server via a plurality of communication paths, the computer data signal causing the at least one client to perform the functions of:

transmitting over a first communication path, to said server, a request message, said request message containing a service identifier associated with a service requested of said server;

receiving a communication path message which is transmitted from said server over the first communication path, said communication path message containing a second communication path, said second communication path being the same as a second communication path which is assigned in response to another request received earlier and containing the same service identifier as that contained in said received request message in a case where it is recorded that the service identified by said service identifier contained in said received request message is provided through broadcast;

switching a communication path to be used for bi-directional communication with said server from the first communication path to the second communication path, in accordance with the communication path message; and receiving service information which is transmitted from said server via the second communication path.

* * * * *